United States Patent [19]

Gajewski

[11] Patent Number: 5,458,361
[45] Date of Patent: Oct. 17, 1995

[54] INSERT FOR AIR BAG COVER ASSEMBLY

[75] Inventor: Gerard H. Gajewski, Dover, N.H.

[73] Assignee: Davidson Textron Inc., Dover, N.H.

[21] Appl. No.: 111,449

[22] Filed: Aug. 25, 1993

[51] Int. Cl.⁶ .................................................. B60R 21/16
[52] U.S. Cl. ..................... 280/728.3; 280/732; 264/242; 264/249; 264/255; 425/130
[58] Field of Search ............................ 280/728 R, 728 A, 280/728 B, 732, 731; 264/242, 249, 250, 255, 274; 425/130

[56] References Cited

U.S. PATENT DOCUMENTS

| 4,335,068 | 6/1982 | Hemery | 264/245 |
| 4,664,864 | 5/1987 | Wersosky | 264/301 |
| 4,784,911 | 11/1988 | Gembinski et al. | 428/402 |
| 4,973,081 | 11/1990 | Rafferty | 280/728 B |
| 5,035,444 | 7/1991 | Carter | 280/728 B |
| 5,082,310 | 1/1992 | Bauer | 280/732 |
| 5,084,122 | 1/1992 | Fukushima et al. | 280/728 B |
| 5,217,253 | 6/1993 | Pray | 280/732 |
| 5,280,947 | 1/1994 | Cooper | 280/728 B |

FOREIGN PATENT DOCUMENTS

| 4220704 | 1/1993 | Germany | 280/732 |
| 0185551 | 7/1992 | Japan | 280/728 B |

Primary Examiner—Eric D. Culbreth
Assistant Examiner—Paul N. Dickson
Attorney, Agent, or Firm—Reising, Ethington, Barnard & Perry

[57] ABSTRACT

An insert and method of molding the insert for use with an instrument panel or the like of a vehicle and in which the insert serves as a structural part of a cover for an air bag assembly and is provided with a door which opens upon being impacted by the inflating air bag and in which the door is formed of a flexible plastic material that is bonded in certain areas to the insert and has its plastic material interlocked with the plastic material of the insert in areas which serve as a hinge for the door.

6 Claims, 4 Drawing Sheets

INSERT FOR AIR BAG COVER ASSEMBLY

TECHNICAL FIELD

This invention concerns air bag cover assemblies and, more particularly, relates to an insert for an air bag cover assembly and a method of molding the insert so it includes a door which provides an air bag deployment opening within the insert when the air bag impacts the door during air bag inflation.

BACKGROUND OF THE INVENTION

It is becoming quite common for vehicles to have both a driver's air bag placed within the steering wheel and a front passenger's air bag provided in the instrument panel. In the manufacture of such instrument panels, a separate door or closure is normally provided within the rigid insert which forms a portion of the instrument panel. The door serves to conceal an air bag assembly, and it has been common practice to connect the door to the insert by using separate fastener means and provide a weakened section within the door or along one side of the door so as to allow the door to tear loose from its support and pivot to an open position as a result of the inflating air bag. Although arrangements of this sort for connecting the door to the main portion of the insert permit the door to open and function properly, it should be apparent that the use of separate fasteners for joining the door to the insert increases the cost of manufacturing and assembling the panel. In addition, by making the door as a separate part, a problem of fit and finish is inherently created.

One example of an instrument panel of the type in which a door is connected to the substrate of the panel through separate fastener means can be seen in U.S. Pat. No. 5,082,310 issued to David J. Bauer on Jan. 21, 1992. Several door arrangements are shown in the Bauer patent that have multiple sections and, in each case, the instrument panel substrate is joined the a door section by separate fastener means. Although the Bauer patent does indicate that the door sections could be made integral with the instrument panel substrate, there is no teaching or disclosure of the method or means for accomplishing this result, which, if done properly, could solve the problem mentioned above. In addition, the U.S. Pat. No. 4,335,068 to Hemery, issued on Jun. 15, 1982, does show the use of two different plastic materials for molding an article. The Hemery patent, however, relates to containers and not to closures or doors for air bag assemblies nor does this patent teach mechanical interlocking of two different plastic materials as would be required for providing an acceptable hinged connection for a door of this type.

SUMMARY OF THE INVENTION

Accordingly, one of the objects of the present invention is to provide a new and improved insert which forms a part of a cover for an air bag assembly and method of making such insert in which the insert has a door formed integrally with the insert so as to permit both the door and insert to be molded within a single mold and, thereby, eliminate the need for separate fasteners for connecting the door to the body of the insert while providing a door which will have a perfect fit within the body of the insert.

Another object of the present invention is to provide a new and improved insert and method of molding the insert for use with a support panel such as an instrument panel of a vehicle and in which the support panel serves as a cover for an air bag assembly and is provided with a door which opens upon being impacted by the inflating air bag and in which the door is formed of a flexible plastic material that is bonded in certain areas to the insert and has its flexible plastic material interlocked with the rigid plastic material of the insert in certain other areas of the door.

A further object of the present invention is to provide a new and improved insert and method of making the insert within a single mold which when closed is provided with an insert cavity and wherein the insert cavity is initially provided with a door cavity separate from the remainder of the insert cavity so as to allow the latter only to be filled with a first plastic material for forming a rigid insert and afterwards removing the barrier surrounding the door cavity and filling the door cavity with a second plastic material that is capable of bonding to the first material and permitting the door to be flexible so as to withstand the impact of the inflating air bag without breaking into pieces while providing a hinged connection with the insert so as to form an opening in the insert through which the air bag can be deployed towards the occupant in the front passenger compartment.

A still further object of the present invention is to provide a new and improved insert and method of making such insert for an automobile instrument panel having an air bag assembly incorporated therein and wherein the insert is characterized by having a rectangular door formed within the insert during the molding of the main body of the insert and wherein two different thermoplastic materials having a natural adhesion therebetween are utilized one of which is used in forming the main body of the insert and the other is used in forming the door so that in one form of the invention the bond lines between the materials serve as weakened boundary areas defining three contiguous sides of the door while the fourth side of the door that serves as the hinged connection with the insert has the thermoplastic material thereof providing a mechanical interlock with the thermoplastic material of the door.

The above objects and others are realized in accordance with the invention by a method in which the door is molded as an integral part of an insert within a mold having an insert cavity defined by an upper mold-half and a lower mold-half. The insert serves as an air bag cover in which the door conceals an air bag assembly and is adapted to provide an air bag deployment opening within the insert when the air bag impacts the door during air bag inflation.

In one form of the present invention, four blades are provided in one of the mold-halfs for movement into the insert cavity so as to form a rectangular door cavity which is separate from and located within the insert cavity. One of the blades is formed with laterally outwardly extending projections so when the blades are moved into the insert cavity to form the door cavity, the projections will extend into the adjacent portion of the insert cavity. Afterwards, a rigid thermoplastic material is injected into the insert cavity so as to surround the projections of the aforementioned blade and fill the insert cavity in all areas except the door cavity and thereby form the main body of the insert. This is followed by a removal of the blades from the insert cavity so that a plurality of projection openings are formed in the first thermoplastic material in the areas previously occupied by the projections and, at the same time, the other three sides defining the door and formed by the material of the insert are exposed to the door cavity. A second thermoplastic material, which is capable of bonding to the material of the insert, is then injected into the door cavity to bond the materials together at their interfaces and also fill the projection openings in the insert so as to provide a mechanical interlock between one side of the door and the insert that will thereafter serve as a hinged connection about which the door is capable of pivoting when impacted by the air bag during inflation thereof.

In another form of the present invention, the projections are provided on all four of the blades so the mechanical interlock of the two thermoplastic materials is provided along all four sides of the door. In this instance, a weakened line formed in the door along three contiguous sides of the door serve as the rupture lines along which the door opens during air bag deployment. In a variation of this embodiment of the present invention, the weakened lines take the form of an "X" with the two weakened lines of the "X" pattern extending from diagonally opposed corners of the door. In another variation of this embodiment of the invention, the weakened lines take the form of an "H" with two opposed sides of the door having a weakened line formed adjacent to and parallel to the interlocked joints with a third weakened line connecting the centers of the weakened lines at the two opposed sides of the door. In still another variation of this embodiment of the invention, the weakened lines take the form of a double "C" which is provided on the door in a manner similar to the "X" pattern with each weakened line being curved rather than straight.

BRIEF DESCRIPTION OF THE DRAWINGS

A more complete understanding of the present invention and of the advantages and features thereof will obtained from a study of the following detailed description when taken in conjunction with the accompanying drawings in which.

DETAILED DESCRIPTION OF THE PREFERRED EMBODIMENTS OF THE INVENTION

Figure 1:
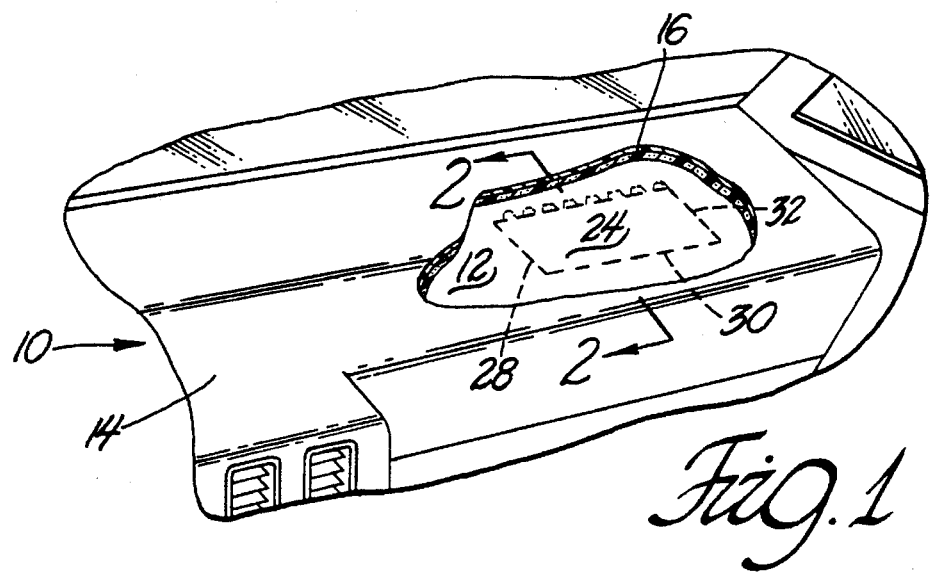
FIG. 1 is a perspective view of a portion of an automobile instrument panel incorporating an insert made in accordance with the present invention and provided with a door which covers an air bag assembly.
Figure 2:
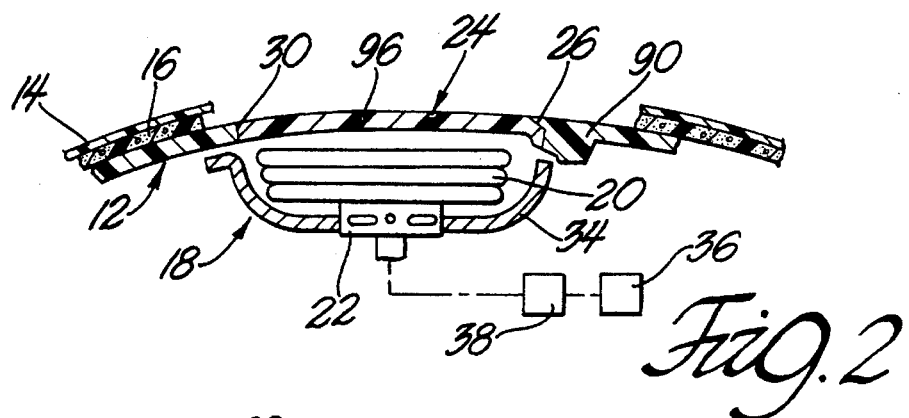
FIG. 2 is a sectional view taken on line 2—2 of FIG.1 showing the air bag assembly located behind the door which is formed as an integral part of the insert.

Referring now to the drawings and more particularly FIGS. 1 and 2 thereof, the passenger side of an automobile dashboard or instrument panel 10 is shown which includes a backing insert 12 molded with a skin shell 14 having a foamed material 16 therebetween. The backing insert 12 serves as a support structure of the instrument panel 10 and is adapted to be secured to the frame portion (not shown) of the automobile. In this instance, the instrument panel 12 has a passenger air bag assembly 18 consisting of an air bag 20 and gas generator 22 incorporated therein that is concealed by and located behind a closure or door 24 which is integrally formed with the backing insert 12 in accordance with the present invention.

As seen in FIG. 1, the door 24 is generally rectangular in configuration and is provided with a hinged connection 26 along one side thereof and weakened hidden tear lines 28, 30, 32 along each of the other three sides of the door 24. As seen in FIG. 2, the insert 12 and door 24 are made of two different thermoplastic materials which are compatible in that they normally bond to each during the molding process of the insert to be described hereinafter.

As seen in FIG. 2, the gas generator 22 of the air bag assembly 18 is mounted within a housing 34 which is secured to a suitable vehicle component not shown. The air bag 20 is shown in a deflated and folded state and is connected to and located above the housing 34. As is conventional, the gas generator 22 serves to supply a suitable pressurized gas to the interior of the air bag 20 for inflating the latter when a sensor 36 is actuated and provides a signal to a controller 38 to initiate gas generation. As the air bag 20 expands during inflation, it impacts against the underside of the door 24 to cause it to swing outwardly about the hinged connection 26 with the insert 12 and provide a rectangular opening in the insert through which the air bag 20 is deployed rearwardly into the front passenger compartment of the automobile.

It will be noted that the skin shell 14, which serves as the outer cover of the instrument panel 10, is made of a thermoplastic material such as polyvinyl chloride resin material (PVC) or urethane, and can be cast molded by processes such as those disclosed in U.S. Pat. Nos. 4,664, 864 and 4,784,911 (both commonly assigned to the assignee of the present invention) or a thermoset urethane material and, afterwards, combined with the backing insert 12 together with the foamed material 16 in a manner well known to those skilled in the art. Although not shown, the skin shell 14 and the foam material 16 can be formed with a hidden tear seam or groove superimposed above the door 24 and vertically aligned with the hidden tear lines 28–32 of the door 24 so when the latter swings open, it causes the foam material 16 and the skin shell 14, as a unit, to rupture along its hidden tear seam and provide the opening for deployment of the air bag 20.

As alluded to above, the body of the insert 12 and the door 24 are made of two different materials. In this regard, the body of the insert 12 can be made of a rigid thermoplastic material such as DYLARK which is a styrene maleic anhydride based engineering resin manufactured by ARCO Chemical Co., or NORYL which is a polyphenylene oxide-based resin manufactured by General Electric Co., G. E. Plastics, or any other similar styrene-based engineered rigid thermoplastic. The material used in making the insert will hereinafter be referred to as "first plastic material".

The door 24 is intended to be made of a flexible material such as DEXFLEX which is a thermoplastic olefin (TPO), made by D&S Plastics Int., or a thermoplastic elastomer (TPE) such as HYTREL made by Dupont Co., Polymer Products Dept. or any similar low-modulus plastic material. The material used in making the door will hereinafter be referred to as "second plastic material".

Figure 3:
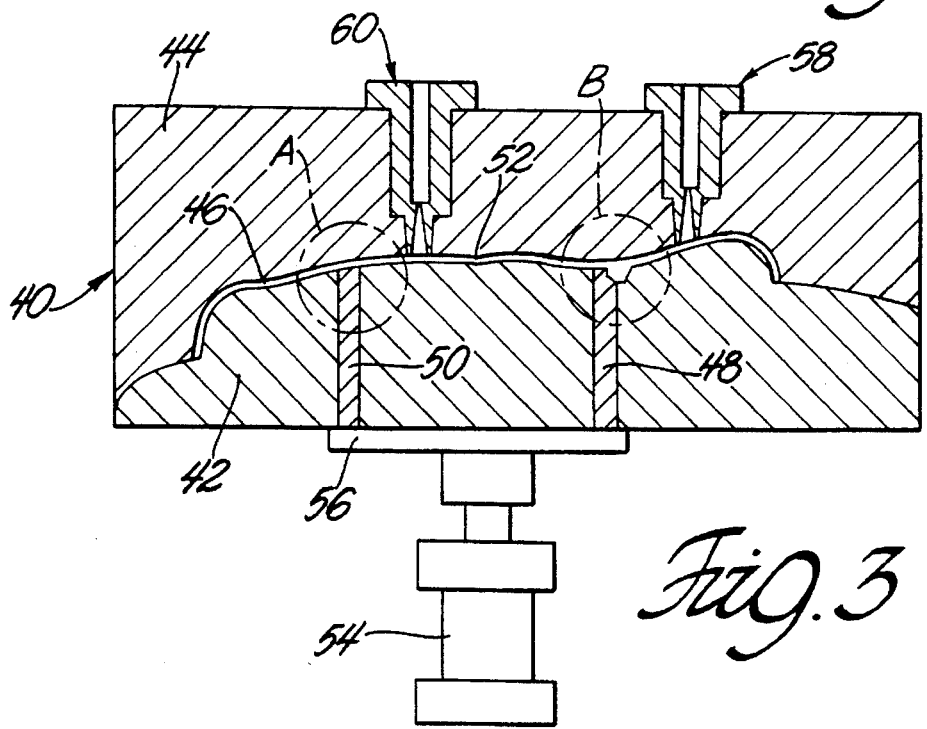
FIG. 3 is a cross-sectional view of a mold apparatus used in making the insert in accordance with the present invention.

In order to mold the door 24 as an integral part of the insert 12 in accordance with the present invention, a molding apparatus 40 as seen in FIG. 3 can be utilized. The molding apparatus 40 includes a lower mold-half 42 and an upper mold-half 44, the latter of which is movable vertically relative to the lower mold-half 42. As seen, the molding apparatus 40 is in the closed position at which time the upper and lower mold-halfs 42 and 44 will define an insert cavity 46 the configuration of which is the same as the configuration of the insert 12 of the instrument panel 10. In this case, the cross-sectional view of the insert cavity 46 seen in FIG. 3 corresponds to the cross-section side view of the insert 12 as seen in FIG. 2.

The lower mold-half 42 includes four blades or dividers two of which only are shown in FIG. 3 and are identified by the reference numerals 48 and 50. The four blades serve to selectively form a door cavity 52 within the insert cavity 46 during the forming of the insert 12 and, accordingly, are located within the lower mold-half so as to provide the rectangular shape of the door 24 seen in FIG. 1. To this end, the four blades are supported within the accommodating lower mold-half 42 for joint vertical movement between a raised position seen in FIGS. 3, 4, and 5 and a lowered position seen in FIGS. 8 and 9. A hydraulic cylinder 54, which is attached to the four blades by a cross bar 56, serves as an actuator to move the blades simultaneously between the aforementioned positions. In addition, the upper mold-half 44 is provided with a pair of injectors 58 and 60 for supplying, respectively, the first thermoplastic material and the second thermoplastic material to the insert cavity 46 and the door cavity 52.

Figure 5:
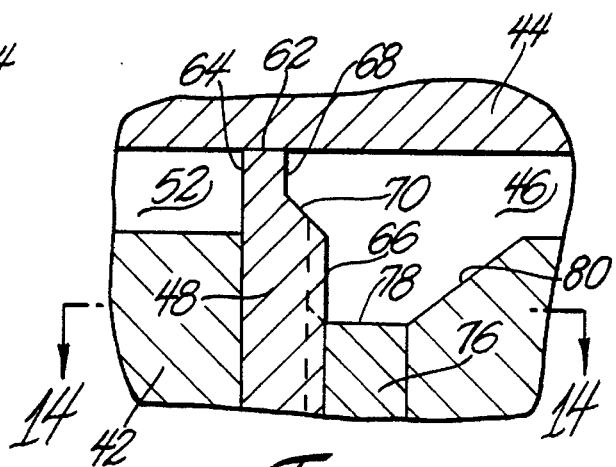
FIG. 5 is an enlarged view of the upper portion of another retractable blade located within the encircled area designated by the letter "B" and shown utilized with the mold apparatus of FIG. 4 for providing the door cavity within the insert cavity.
Figure 14:
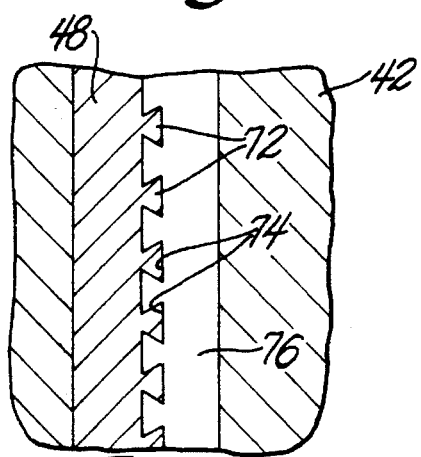
FIG. 14 is a sectional view taken on line 14—14 of FIG. 5.

As seen in FIGS. 5 and 14, the blade 48 has its upper head portion formed with a top wall 62 and opposed sides walls 64 and 66. The side wall 66 is notched at its upper portion so as to provide a subwall 68 which connects with an angled wall 70 formed on the blade 48. Below the angled surface 70 of the blade 48, the side wall 66 is formed with a plurality of equally spaced and identical projections 72 each of which, in the preferred form, is shaped as a dovetail as seen in FIG. 14. Other shapes of the projections 72 can be used so long as they provide a mechanical interlock of the type to be described below.

Each of the projections 72 is located within and adapted to slide relative to a similarly shaped dovetail opening 74 formed in a block 76 fixedly mounted in the lower mold-half 42 as seen in FIGS. 5 and 14. Thus, the dovetail projections 72 on the blade 48 are received by the dovetail openings 74 so when the blade 48 is in the lowered position, an enlarged joint section is provided adjacent blade 48 and in the insert cavity 46 and is defined by the top wall 62 of the blade 48, the subwall 68, the angled wall 70, a top wall 78 of the block 76 and an angled wall 80 of the lower-half mold. It will be noted that the dovetail openings 74 of the block 76 form similar dovetail projections which cooperate with the projections 72 to seal the enlarged section at the surface of the angled wall 70 when the blade 48 is in the lowered position of FIG. 7 and thereby prevent plastic material from flowing downwardly into the spaces between the projections 72. In addition, although not shown, the blade 48 and the cooperating block 76 will each have a length (when viewed from above) which corresponds to the length of the side of the door 24 along the hinged connection 26 as seen in FIG. 1.

Figure 4:
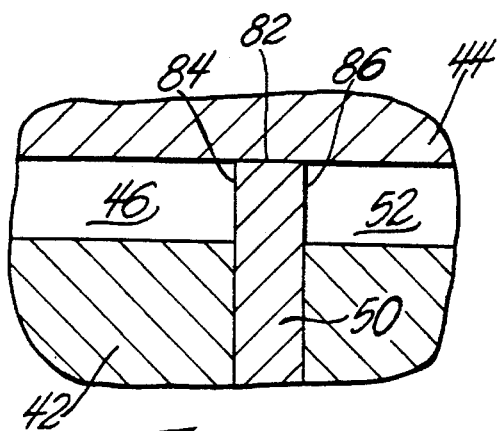
FIG. 4 is an enlarged view of the upper portion of one of the retractable blades located within the encircled area designated by the letter "A" and shown utilized with the mold apparatus of FIG. 3 for providing a door cavity within an insert cavity and shows the blade in the raised position.

As seen in FIG. 4, the blade 50 serves to provide the weakened tear line 30 of the door 24 as seen in FIG. 1 and has a length, when viewed from above, that corresponds to the length of the weakened tear line 30. It will be understood that each of the other two blades (not shown) supported within the lower mold-half 42 are intended to provide the tear lines 28 and 32 at the opposed sides of the door 24 and each will be of a length corresponding to the length of the tear lines 28 and 32 as seen in FIG. 1. In addition, the blade 50 and each of the blades for providing tear lines 28 and 32 is formed with a top wall 82 and laterally spaced and parallel side walls 84 and 86 as seen in FIG. 4.

Figure 6:
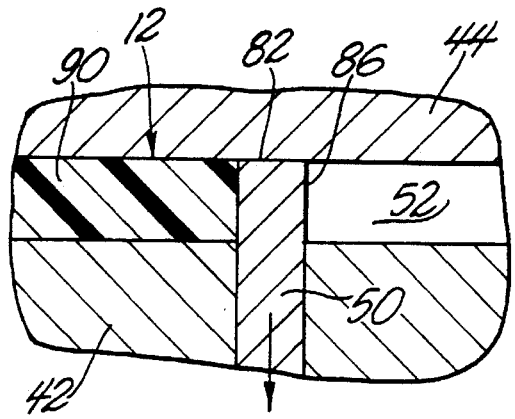
FIGS. 6 and 7 are views similar to those shown in FIGS. 4 and 5, respectively, showing the insert cavity surrounding the door cavity filled with a rigid thermoplastic material.
Figure 7:
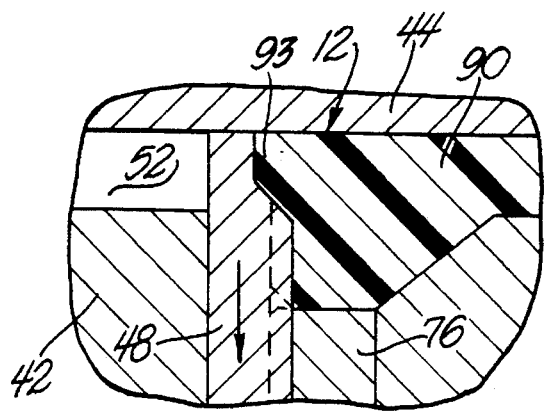
Figure 8:
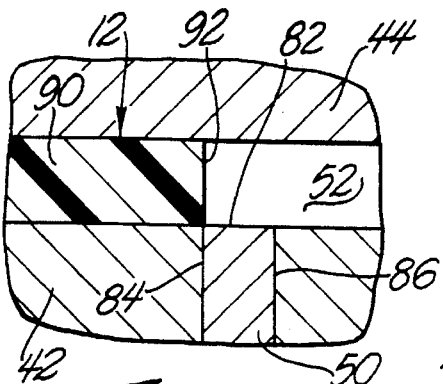
FIGS. 8 and 9 are views similar to those shown in FIGS. 6 and 7, respectively, but shows the blades removed from the insert cavity and in the lowered position.
Figure 9:
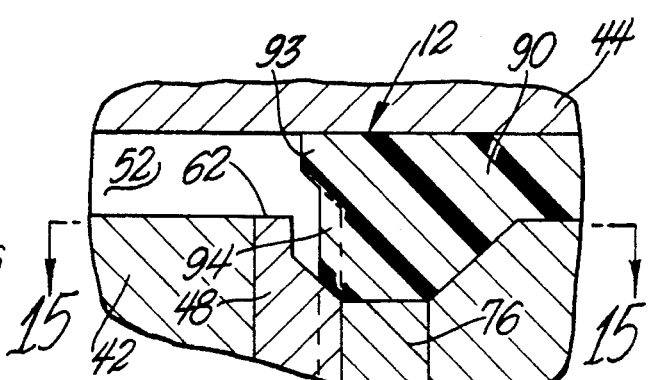
Figure 10:
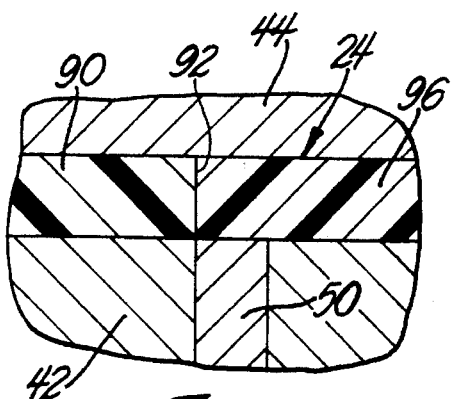
FIGS. 10 and 11 are views similar to those seen in FIGS. 8 and 9, respectively, but shows the door cavity filled with a flexible thermoplastic material with the two thermoplastic materials bonded to each other at a butt joint in FIG. 10 and mechanically interlocked in FIG. 11.
Figure 11:
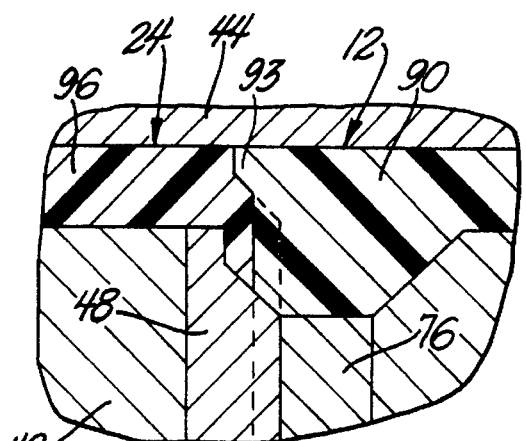
Figure 15:
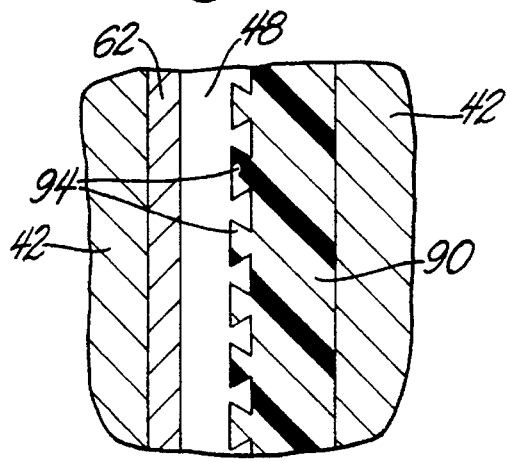
FIG. 15 is a sectional view taken on line 15—15 of FIG. 9.

In practicing the process for forming the insert 12, the mold apparatus 40 is initially closed as seen in FIG. 3 and the blades 48 and 50 and the other two blades connected thereto are positioned by the cylinder 54 in the raised position so as to divide the door cavity 52 from the remainder of the insert cavity 46. This is then followed by supplying the first plastic material 90 into the insert cavity 46 via the injector 58 to fill the entire insert cavity 46 as seen in FIGS. 6 and 7 except for the door cavity 52 which is blocked from communication with the remainder of the insert cavity 46 by the raised blades. With the blades 48 and 50 and the other two blades in the raised position seen in FIGS. 6 and 7 and after the first plastic material 90 has solidified sufficiently so as to maintain its shape, the blades are moved by the hydraulic cylinder 54 to the lowered position as seen in FIGS. 8 and 9 so as to expose the surfaces of the first plastic material 90 facing the door cavity 52. In other words, when the four blades are moved to the lowered position of FIGS. 8 and 9, a flat vertical surface 92 will be exposed to the door cavity 52 along three sides of the door cavity 52 preparatory to the formation of the weakened tear lines 28, 30 and 32 of the door 24. At the same time, the withdrawal of the blade 48 from the insert cavity 46 will expose to the door cavity 52 a cantilevered section 92 seen in FIG. 9 as well as the formed dovetails 94 seen in FIG. 15 located in the enlarged section. After the lowering of the blades, the second plastic material 96 is supplied to the door cavity 52 via the injector 58 to fill the door cavity 52. At this point, the second plastic material 96 will flow into the spaces between the dovetails 94 formed by the first plastic material 90 and provide a mechanical interlock therewith as seen in FIG. 11. At the same time, the second plastic material 96 will adhere to the section 92 and will form a butt joint with the first plastic material at the surface 92 as seen in FIG. 10 along the remaining three sides of the door 24. Thus, the two plastic materials 90 and 96 will bond together at the butt joint to form the weakened tear lines 28, 30 and 32 as seen in FIG. 1.

Figure 12:
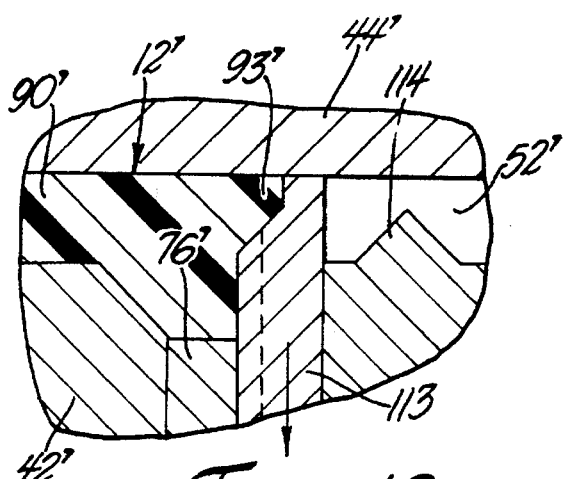
FIG. 12 shows a blade similar to the blade seen in FIG. 5 substituted for the blade seen in FIG. 4 and used with rib means formed in the door cavity of the lower mold half for providing a weakened line within a modified form of the door.
Figure 13:
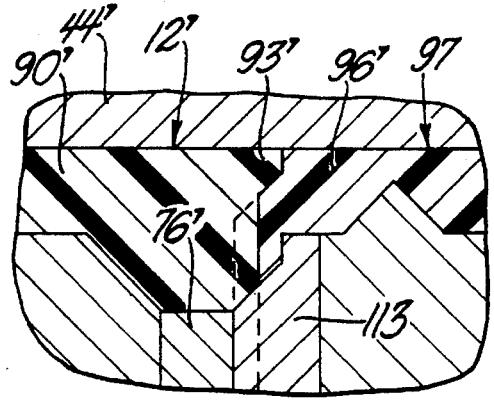
FIG. 13 is a view similar to that shown in FIG. 12 but with the blade in the lowered position and the thermoplastic material of the insert and that of the door joined together by a mechanical interlock.
Figure 16:
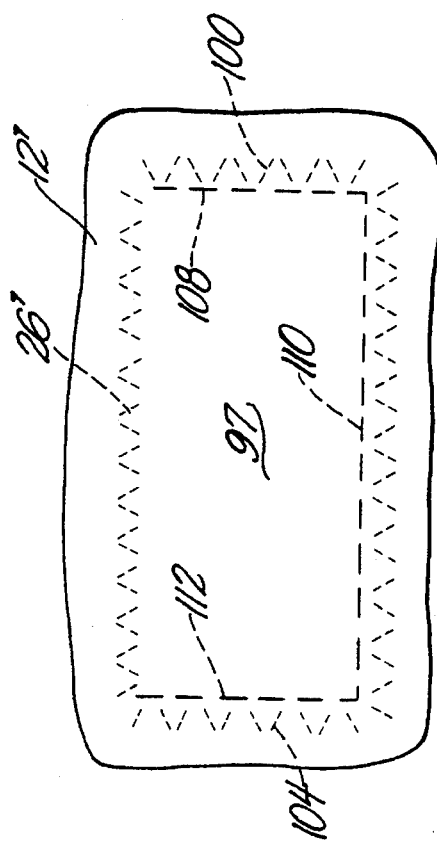
FIG. 16 shows the type of door formed in the insert when using the blade seen in FIG. 16.

FIG. 16 shows another form of door 97 which could be substituted for the door 24 in the insert 12. In this case, all parts corresponding to the parts of the insert 12 will be identified by the same reference numerals except primed. Rather than having the butt joint connections described above at the three contiguous sides of the door 24 serving as the weakened tear lines, dovetail type interlocking connections 100, 102 and 104 can be provided along all three sides of a door 97 as seen in FIG. 16 with weakened tear lines 108, 110, and 112 located inwardly from the three contiguous sides of the door 97. In order to do so, the four blades defining the door 97 would take the form of the blade 48 and have the same dovetail configuration and outer surface configuration. Thus, as seen in FIG. 12, a dovetail type blade 113 would be substituted for the blade 50 seen in FIG. 3 and the same type of dovetail blades would be provided for forming the opposed sides of the door 97. In addition, the lower mold-half would be formed with a V-shaped rib 114 which would be located inwardly from the associated blade extending the length of the associated blade and serve to provide a weakened line within the plastic material 96' of the door 97 as seen in FIG. 13. In this manner, the weakened tear lines 108–112 would be provided as seen in FIG. 16 with the two plastic materials 90' and 96' of the insert and door 97 being interlocked along all four sides of the door 97.

Figure 17:
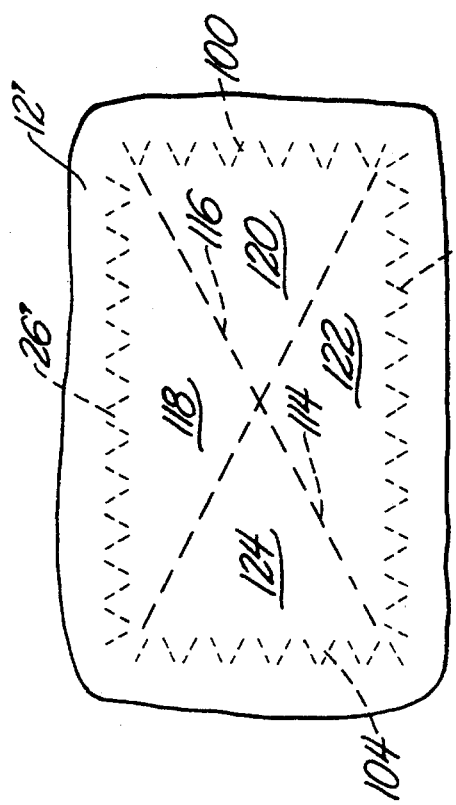
FIGS. 17 through 19 show other forms of door configurations which can be made in accordance with the present invention.
Figure 19:
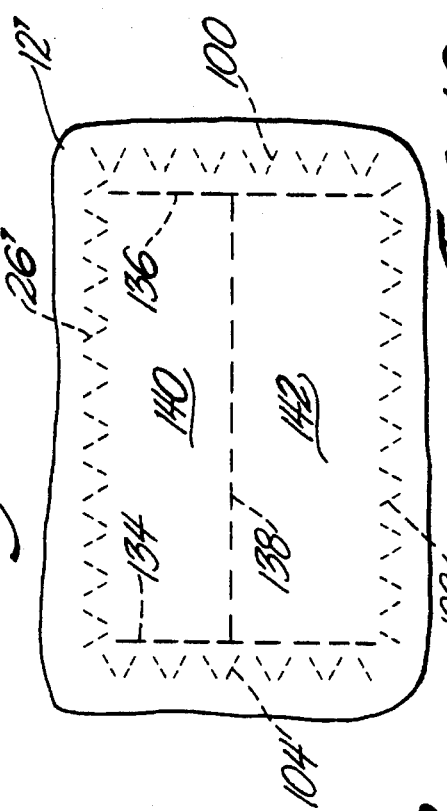
Figure 18:
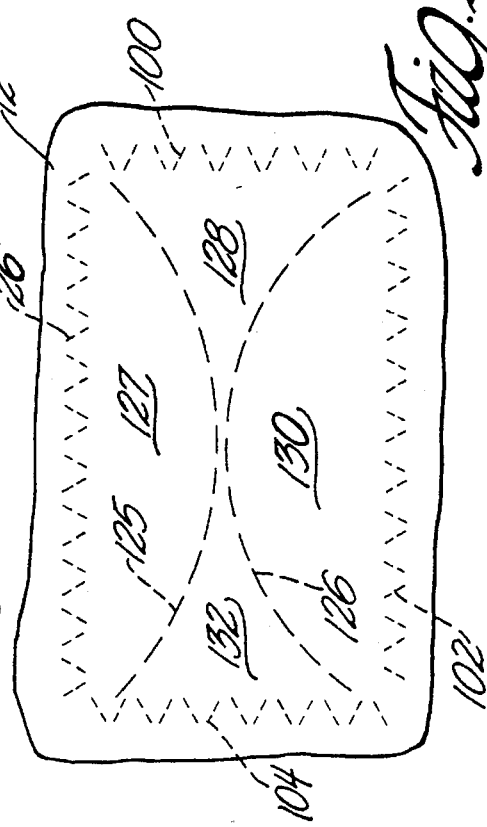

FIGS. 17–19 show variations of the door 97 seen in FIG. 16. For example in the FIG. 17 variation of the door, rather than having the ribs in the mold-half 42' located along the three sides of the door, two ribs would be provided in the lower mold-half 42' connecting diagonally opposed corners of the door and crossing each other at the center of the door. This would permit the weakened tear lines 114 and 116 to take the form of an "X" and provide four flap type closure members 118, 120, 122 and 124 each of which is connected to the body of the insert 12' by a hinged connection formed by the interlocked plastic materials.

In the FIG. 18 variation of the door 97, the ribs located within the door cavity for providing the weakened tear lines or seams 125 and 126 would be curved as shown so as to provided four flap type closure members 127, 128, 130 and 132 each having a hinged connection with the main body of the insert in the manner of the door seen in FIG. 17. In order to form the door seen in FIG. 19, the ribs formed in the door cavity of the lower mold-half would take the form of an "H" so as to provide parallel weakened tear lines 134 and 136 at opposed sides of the door the centers of each of which would be connected by a weakened tear line 138 so as to form two flap type doors 140 and 142.

As alluded to hereinbefore, in practicing the present invention it is important that there be a natural adhesion between the thermoplastic material of the insert and the thermoplastic material of the door so that the door and insert can be manufactured in one piece and connected to each other at their interfaces. In addition, the thermoplastic material used for making the insert should be such that it permits the insert to be rigid and stiff so as to reduce squeak and rattle when installed in the vehicle and also have high temperature endurance to resist warpage and the high sun loads which vehicle instrument panels are exposed to. Also, the thermoplastic material used for making the door should provide a door which is flexible so, when required, a portion spaced inwardly from the interlocked connection provided between the door and insert can serve as a hinge and the body of the door will not create any fragments when impacted by the air bag during inflation thereof.

Finally, it will be noted that the cantilevered section 92 above the dovetail interlock of the plastic materials 90 and 96 serves as a roof which reinforces the hinged connection thereby helping prevent the inflating bag from disconnecting or separating the dovetail interconnection when the inflating air bag impacts the under side of the door.

Various changes and modifications can be made in the above-described insert and method without departing from the spirit of the invention. Such changes and modifications are contemplated by the inventor and he does not wish to be limited except by the scope of the appended claims.

The embodiments of the invention in which an exclusive property or privilege is claimed are defined as follows:

1. An air bag cover assembly including an insert having a door integrally formed with the insert for concealing an air bag and adapted to provide an air bag deployment opening within the air bag cover assembly when the air bag impacts the door and fractures weakened sections of the insert to allow the door to pivot about a hinged connection during air bag inflation, the improvement wherein said insert is made from a rigid plastic material and said door is made from a flexible plastic material which is bonded to said rigid plastic material, and said hinged connection is composed of a mechanical interlock of said flexible plastic material and said rigid plastic material that is produced by the configuration of said flexible plastic material and the complementary configuration of said rigid plastic material at said hinged connection, said configuration of said flexible plastic material and said complementary configuration of said rigid plastic material each have the shape of a dovetail.

2. The air bag cover assembly set forth in claim 1 wherein said door has a rectangular shape and said mechanical interlock joining said door and said insert extends along each side of said door.

3. The air bag cover assembly set forth in claim 2 wherein a weakened tear line is formed in said door along three sides of said door.

4. The air bag cover assembly set forth in claim 2 wherein a pair of weakened tear lines are provided at opposed sides of said door and a third weakened tear line interconnects the centers of said pair of weakened tear lines.

5. The air bag cover assembly set forth in claim 2 wherein a pair of weakened tear lines interconnect diagonally opposed corners of the door.

6. The air bag assembly set forth in claim 1 wherein a roof portion is provided above said mechanical interlock for helping prevent said mechanical interlock from disconnecting upon impact of the inflating air bag.

* * * * *